United States Patent
Straub et al.

[19]

[11] Patent Number: 6,035,649
[45] Date of Patent: Mar. 14, 2000

[54] METHOD FOR CONTROLLING THE EVAPORATOR TEMPERATURE OF AN AIR CONDITIONER AS A FUNCTION OF THE OUTSIDE DEW POINT

[75] Inventors: Wolfgang Straub, Deggingen; Herbert Wieszt, Grafenau, both of Germany

[73] Assignee: DaimlerChrysler AG, Germany

[21] Appl. No.: 09/110,263

[22] Filed: Jul. 6, 1998

[30] Foreign Application Priority Data

Jul. 4, 1997 [DE] Germany ............................ 197 28 577

[51] Int. Cl.⁷ .................. B60H 1/20; F24D 11/00
[52] U.S. Cl. .................... 62/93; 62/176.6; 236/44 A; 454/121
[58] Field of Search ............... 62/93, 176.6, 223; 236/44 A, 44 C; 454/121

[56] References Cited

U.S. PATENT DOCUMENTS

| | | | |
|---|---|---|---|
| 3,803,863 | 4/1974 | Jednacz et al. | 62/227 X |
| 4,412,424 | 11/1983 | Iida et al. | 454/121 X |
| 5,516,041 | 5/1996 | Davis, Jr. et al. | 62/176.6 |

FOREIGN PATENT DOCUMENTS

| | | |
|---|---|---|
| 36 24 171 | 1/1988 | Germany . |
| 37 24 430 | 2/1989 | Germany . |
| 195 17 336 | 11/1995 | Germany . |
| 404084074 | 3/1992 | Japan ............................. 62/176.6 |

*Primary Examiner*—William Wayner
*Attorney, Agent, or Firm*—Evenson, McKeown, Edwards & Lenahan, P.L.L.C.

[57] ABSTRACT

A method for controlling the evaporator temperature of an air conditioner as a function of the outside dew point, in which the dew point temperature of the intake air drawn in by the air conditioner to air-condition an interior and the blown air temperature setpoint that is associated with one or more variably presettable interior temperature setpoints is determined for the intake air to be blown out into the interior. At the beginning of each cooling cycle, a determination is made as to whether the evaporator is wet or dry. The evaporator temperature is then adjusted to a setpoint that is at most approximately as high as the dew point temperature and otherwise is approximately as high as the blown air temperature setpoint. This is for cases within presettable limits, with a wet evaporator and a blown air temperature setpoint that is above the intake air dew point temperature. Alternatively, interrogation of the evaporator state can be eliminated and the smaller of the blown air temperature setpoint and the outside temperature dew point temperature differential is selected as the evaporator temperature. A typical use of the method, for example, is in the air conditioners of motor vehicles.

8 Claims, 3 Drawing Sheets

METHOD FOR CONTROLLING THE EVAPORATOR TEMPERATURE OF AN AIR CONDITIONER AS A FUNCTION OF THE OUTSIDE DEW POINT

BACKGROUND AND SUMMARY OF THE INVENTION

This application claims the priority of German Application No. 197 28 577.5, filed Jul. 4, 1997, the disclosure of which is expressly incorporated by reference herein.

The invention relates to a method for controlling the evaporator temperature of an air conditioner as a function of the outside dew point. Here, the dew point temperature of the intake air drawn in by the air conditioner (for air conditioning an interior) and the blown air temperature setpoints that are associated with one or more variably specifiable interior temperature setpoints for the intake air to be blown out into the interior are determined. In this context, the term "control" is to be understood in its broader sense and therefore includes both the case of pure control without feedback, as well as the case of regulation with feedback of the evaporator temperature's actual value to a control or regulating unit of the air conditioner. Determination of the intake air dew point temperature and blown air temperature setpoint is conventionally used, for example, to control (as a function thereof) a compressor that is located in the coolant circuit of the evaporator and can be switched on and off, or whose power can be regulated in such fashion that the desired evaporator temperature is obtained.

Such methods are particularly used for air conditioners of motor vehicles. Motor vehicle air conditioners of a modern conventional design have two basic operating modes for cooling operations. In a first operating mode without reheating, the evaporator temperature is controlled by the appropriate adjustment of the compressor power in such a manner that the intake air guided over the evaporator is only cooled to the point specified by an air conditioning regulator of the air conditioner in order to maintain an interior temperature that can be specified by the user. Therefore, only as much energy is used as is actually required for cooling the interior. However, no air drying takes place in this operating mode, so that precipitation on the vehicle window can occur in certain situations. In addition, under certain conditions, undesired evaporator odors in the form of drying odors can occur that are caused by a frequent change of the evaporator state, i.e., the state of the evaporator surface, between wet and dry when the evaporator temperature oscillates around the intake air dew point temperature.

The second operating mode is so-called reheating or counter-heating operation. In this mode, the compressor uses the evaporator to cool the intake air drawn in from the outside until shortly before the icing point at 0° C. By means of a heating element that is located downstream from the evaporator in the intake air stream (in the form of a heat conductor for example), the intake air is then heated to the blown air temperature setpoint that is determined by the air conditioner regulator. In this operating mode, drying of the intake air takes place at the evaporator. This limits the tendency for condensation to form on the windows, and/or any windows that have condensation on them become clear once again. In addition, there are no excessive evaporator odors. However, energy consumption is significantly higher in this operating mode than in the first operating mode, since a higher cooling power is required and additional energy is also required for reheating.

Vehicle air conditioners with these two cooling modes are disclosed for example in German patent documents DE 36 24 171 A1 and DE 37 24 430 A1. The air conditioner described in DE 36 24 171 A1 incorporates a dew point temperature sensor system inside and/or outside that consists of a temperature sensor and a moisture sensor, with which an imminent undershoot of the dew point can be detected. This can be prevented by countermeasures, for which purpose the incorporation of an air blower is proposed in order to be able to blow a stream of air directed at the windows. Additionally, if necessary, the air to be blown out into the interior can be suitably conditioned by heating and/or dehumidification in order to prevent condensation on the windows. In DE 37 24 430 A1 the operating mode without reheating is selected as long as the outside temperature is higher than the inside room temperature setpoint.

The evaporator temperature is then set by so-called continuous cold regulation as a function of changes between the setpoint and the actual value of the interior temperature. If the outside temperature is between 0° C. and the interior temperature setpoint, moderate reheating is selected in which the temperature of the reheating element is set as a function of the difference between the setpoint and the actual value of the interior temperature. At the same time, the evaporator temperature setpoint is adjusted so that it is always below the outside temperature by a constant preset value of 6° C., for example. As a result of this limited drop in evaporator temperature, a sufficient amount of dehumidification is achieved with an acceptable level of energy consumption. The air humidity conditions (i.e, the intake air dew point temperature) in this type of evaporator temperature control are not taken into account.

It is known for example from German patent document No. DE 195 17 336 A1 to limit the setpoint for the evaporator temperature to a presettable maximum value to avoid odors.

It is an object of the present invention to provide a method for controlling the evaporator temperature of an air conditioner as a function of the outside dew point such that during cooling operation of the air conditioner no (or at most only comparatively minor) evaporator odors occur, while at the same time the consumption of energy is kept relatively low. In addition, the occurrence of undesired condensation effects such as precipitation on the windows in the case of vehicle air conditioners is prevented in reliable manner.

This and other objects and advantages are achieved by the method, according to the invention, for controlling the evaporator temperature of an air conditioner as a function of the outside dew point, especially a motor vehicle air conditioner in which the dew point temperature of the intake air drawn in by the air conditioner to air-condition an interior and the blown air temperature setpoint associated with one or more variably presettable interior temperature setpoints are determined for the intake air to be blown out into the interior. At the beginning of each cooling phase of air conditioner operation, a determination is made as to whether the evaporator is in a wet or dry state. (In other words, whether the evaporator surface is wet or dry). Then the evaporator temperature is adjusted to a setpoint that, within presettable temperature limits, with a wet evaporator state and a blown air temperature setpoint which is above the intake air dew point temperature, is chosen to be no higher than the intake air dew point temperature. Otherwise the evaporator temperature set point is chosen to be approximately as high as the blown air temperature setpoint.

This procedure has the advantage that the evaporator state which prevails at the outset is maintained (as much as possible) during the following cooling operation phase.

Also, within the framework of this condition, the energy consumption for conditioning the intake air is kept relatively low. As noted before, if the evaporator state is initially wet and the blown air temperature setpoint is above the intake air dew point temperature, the maximum evaporator temperature is limited at the upper end to the intake air dew point temperature, so that the wet evaporator state is maintained. By suitable reheating, the intake air that is cooled at the evaporator to at least the intake air dew point temperature is again raised to the blown air temperature setpoint. On the other hand, if the evaporator state is initially wet but the blown air temperature setpoint is below the intake air dew point temperature, the evaporator temperature is adjusted to the blown air temperature setpoint, so that the wet evaporator state is maintained and no reheating is normally required.

If the evaporator is initially dry, the evaporator temperature is adjusted to the blown air temperature setpoint. With a blown air temperature setpoint that is above the intake air dew point temperature, this means that the dry evaporator state is maintained. It is only when the blown air temperature setpoint is below the intake air dew point temperature, and the evaporator is initially dry, that a single change of evaporator state from dry to wet during the subsequent cooling operation phase is unavoidable.

In general, the number of changes between dry and wet evaporator states during the operation of the air conditioner and hence the evaporator odors caused thereby are minimized. In addition, it is generally only in the case of initially wet evaporators and with a blown air temperature setpoint that is above the intake air dew point temperature that active reheating is required in the subsequent cooling operation phase. As a result, the overall energy consumption remains relatively low without the occurrence of any undesirable condensation effects.

In an advantageous embodiment of the present invention, the initial evaporator state is determined in a relatively simple manner by detecting and comparing the evaporator temperature with the determined intake air dew point temperature. When the initial evaporator temperature is higher than the intake air dew point temperature, an initially dry evaporator state is assumed. On the other hand, if the initial evaporator temperature is lower than the intake air dew point temperature, an initially wet evaporator state is assumed.

In still another advantageous embodiment of the present invention, the evaporator temperature is adjusted to a setpoint that is specified within presettable temperature limits as the minimum value of all blown air temperature setpoints as well as the difference between the actual and dew point temperatures of the intake air. In other words, the outside air minus a suitably selectable offset point. Apparently, with this comparatively simple method, only a few changes between the dry and wet evaporator states occur during the operation of the air conditioner. However, no interrogation of the evaporator state takes place in this case. Nevertheless, with this method, the previously mentioned advantageous embodiments can also be achieved in largely the same manner.

In very wet weather, the dew point temperature approximately corresponds to the actual outside temperature of the intake air, so that the corresponding difference is near 0° C., and thus practically the maximum evaporator power is set in order to achieve the desired dehumidification of the air. In this case, the evaporator remains wet constantly. With high outside temperatures and dry weather, on the other hand, the evaporator temperature to be set can be determined by the minimum blown air temperature setpoint. As a result, depending on the operating conditions, the evaporator usually remains constantly wet or dry.

Other objects, advantages and novel features of the present invention will become apparent from the following detailed description of the invention when considered in conjunction with the accompanying drawings.

DETAILED DESCRIPTION OF THE DRAWINGS

Figure 1:
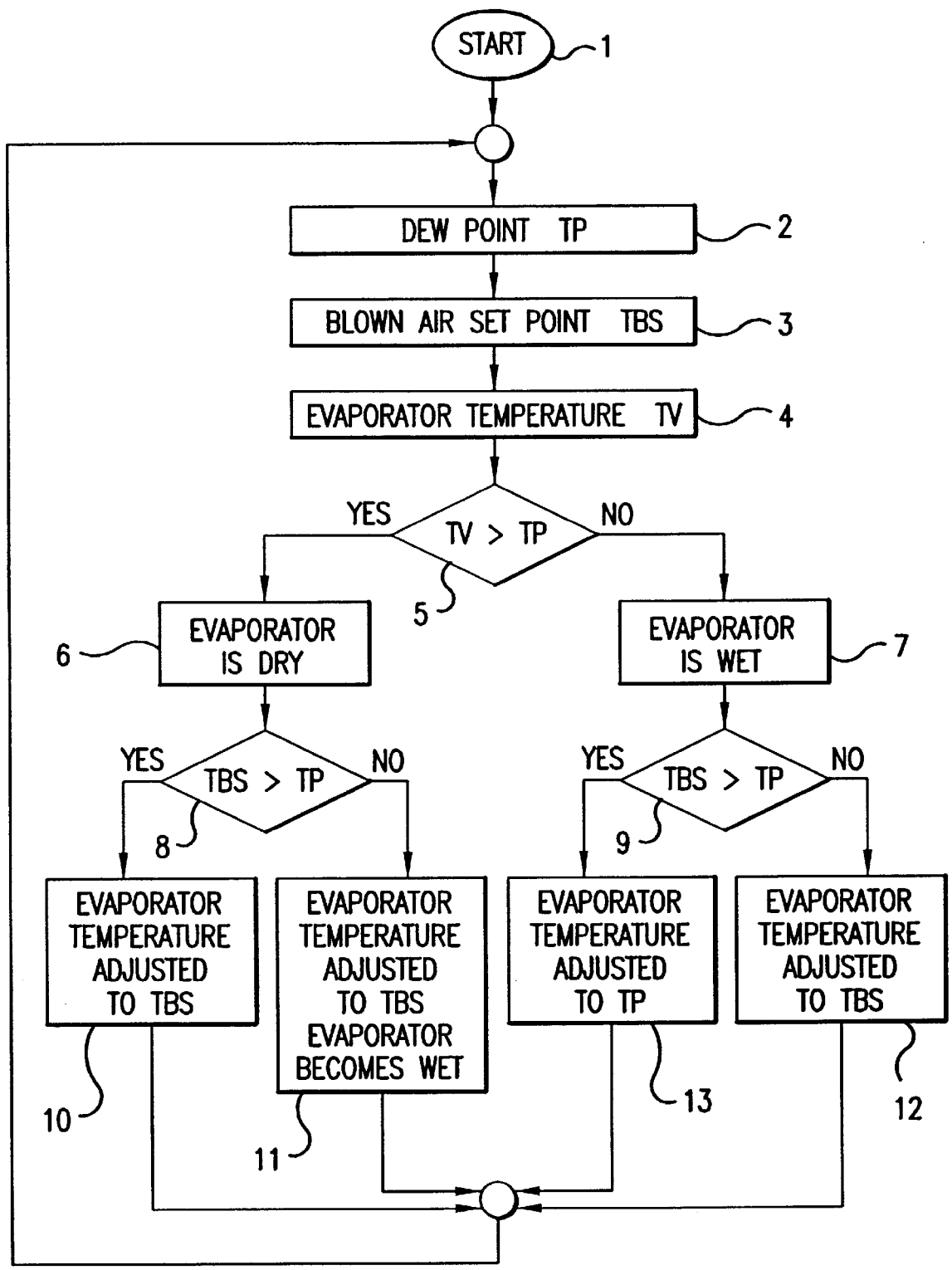
FIG. 1 is a flowchart of a first exemplary method of controlling the evaporator temperature of an air conditioner as a function of the outside dew point.

The method whose essential steps are shown in FIG. 1 is especially suitable for controlling the evaporator temperature of a motor vehicle air conditioner as a function of the outside dew point. The air conditioner is a conventional design with a cold compressor located in the coolant circuit of the evaporator, for example. The compressor can be adjusted to vary the evaporator temperature in terms of its cold power, for which purpose a conventional compressor whose power can be regulated externally or a compressor that can be switched on and off by a magnetic clutch or the like can be used, for example. In those instances in which no further details of the operation of the air conditioner are provided in the following, this takes place in any of the conventional modes and with the components usually employed. In the present case, it is the cooling operation that is of interest and in particular the control of the evaporator temperature whose method sequence is shown in the flowchart.

The method used for this purpose according to the figure begins following a starting step 1 that represents the starting of the vehicle or in any case the beginning of a cooling operation phase of the air conditioner, with a step 2 in which the intake air dew point temperature TP is determined. This can be accomplished by using a dew point sensor or a sensor pair that consists of a temperature sensor and a moisture sensor that are located at a suitable point where they are in contact with the outside from which the intake air is drawn. The output signals from the dew point sensor and/or the temperature and/or moisture sensor pair are read into a control device of the air conditioner which determines the intake air dew point temperature TP from this.

In the next step 3, the blown air temperature setpoint TBS, in other words the setpoint of the intake air conditioned by the air conditioner and to be blown into the interior, is determined on the basis of one or more interior temperature setpoints that can be variably selected by the vehicle occupants. Specifically, the blown air temperature setpoint is set to the single one or the smallest of several interior temperature setpoints specified separately for various air ducts of a multiduct air conditioner. This is in order to be able to lower the interior temperature in the desired manner. Of course, in order to set the blown air temperature setpoint lower than the lowest interior temperature setpoint, a certain temperature offset can be provided for this purpose if necessary.

In a subsequent step 4 the evaporator temperature TV is detected. This can be accomplished by measuring the evaporator air temperature. Alternatively, the evaporator temperature TV can be detected by measuring the evaporator surface temperature. After the air conditioner control device obtains all of the necessary input information in this manner, in an interrogation step 5, it checks whether the evaporator temperature TV is higher than the intake air dew point temperature TP. If this is the case, this is interpreted as a dry evaporator state (step 6), while a negative result of this comparison is interpreted as a wet evaporator state (step 7). As an alternative to this determination of the evaporator state, by comparing the evaporator temperature TV and the intake air dew point temperature TP, the evaporator state can also be determined by a direct measurement of the moisture state of the evaporator surface via a suitable moisture sensor.

The method then proceeds, both in the case of a detected dry evaporator state and a detected wet evaporator state, with a corresponding interrogation step 8, 9 in which the air conditioner control device checks whether the blown air temperature setpoint TBS is higher than the intake air dew point temperature TP. If this is the case and a dry evaporator is present, the control device adjusts the evaporator temperature to the blown air temperature setpoint TBS. In other words, the control device adjusts the evaporator temperature to the lowest interior temperature setpoint (step 10). A requirement for this is that the blown air temperature setpoint TBS is above a preset minimum icing protection temperature which typically is on the order of 1° C.

In the present operating situation, as well as in all other operating situations, the evaporator temperature TV is always limited at the lower end by this minimum icing protection temperature in order to prevent icing phenomena on the evaporator. Since the blown air temperature setpoint TBS and the evaporator temperature TV in this operating case are thus above the intake air dew point temperature TP, the dry evaporator state is still maintained during subsequent cooling operations. In addition, by adjusting the evaporator temperature TV to the blown air temperature setpoint TBS, the intake air is conditioned only by the evaporator as required without reheating being required. As a result, the amount of energy consumed is kept low.

If the evaporator is initially dry but the blown air temperature setpoint TBS is below the intake air dew point temperature TP, the evaporator temperature TV must necessarily be lowered below the intake air dew point temperature TP so that the evaporator becomes wet. This means there is a single change in evaporator state from dry to wet in the subsequent cooling operation phase. The evaporator temperature TV is then once again advantageously adjusted to the blown air temperature setpoint TBS (step 11).

If the evaporator is already initially wet, or has become wet as a result of the one-time change of state mentioned above, and the blown air temperature setpoint TBS is below the intake air dew point temperature TP, the evaporator temperature TV is again adjusted to the blown air temperature setpoint TBS (step 12). The evaporator temperature TV thus remains below the intake air dew point temperature TP so that the evaporator remains constantly wet. In order to ensure this in a reliable manner, even at blown air temperature setpoints TBS that are close to the intake air dew point temperature TP, a provision is advantageously made in this operating mode for the evaporator temperature TV to remain below the intake air dew point temperature TP. A sufficient safety margin of 3K, for example, is provided. As a result, at blown air temperature setpoints TBS that are below the intake air dew point temperature TP by less than this safety margin, an adjustment is made. This adjustment is not exactly to the blown air temperature setpoint TES, but to a value that is below the intake air dew point temperature TP by the safety margin. The value only approximately corresponds to the blown air temperature setpoint TBS. The temperature differential that results in this special case for the intake air can be compensated by slight reheating with low energy expenditure.

If the wet evaporator state prevails and the blown air temperature setpoint TBS is above the intake air dew point temperature TP, the evaporator temperature TV is adjusted to the intake air dew point temperature TP (step 13), with this once again being understood to mean that (strictly speaking), the evaporator temperature TV is adjusted to a temperature that is below the intake air dew point temperature TP by the safety margin of 3K (for example). In this manner, the wet evaporator state is maintained during the further course of the cooling phase.

The existing temperature differential between the evaporator temperature TV, which then roughly corresponds to the intake air dew point temperature TP, which in turn approximately corresponds to the intake air temperature at the evaporator outlet, and the blown air temperature setpoint TBS which is higher by comparison, is compensated by suitable reheating. This operating mode is representative of the method according to the invention. In this case, instead of adjusting the evaporator temperature TV to the blown air temperature setpoint TBS and thus being able to eliminate reheating, in favor of maintaining a wet evaporator state and hence avoiding more frequent changes in the evaporator state between wet and dry, the evaporator temperature TV is limited to the intake air dew point temperature TP and compensatory reheating is taken into account for this purpose. Of course, as an alternative to the abovementioned adjustment to approximately the intake air dew point temperature TP, the evaporator temperature TV can also be adjusted if necessary to any other value between the minimum icing protection temperature and the intake air dew point temperature TP.

Following the respective current evaporator temperature regulating steps 10, 11, 12, 13, the method returns to perform a new method cycle starting before step 2, with the air conditioner control device determining the respective cycle frequency. Of course, the temperature conditions provided for the above example are not quantitatively but qualitatively exact and, as is readily apparent to the individual skilled in the art, must be suitably adapted to a given air conditioner system. Thus, the adjustment of the evaporator temperature TV to the blown air temperature setpoint TBS and/or the intake air dew point temperature TP should be understood not in a completely exact sense but only qualitatively in each case. As is readily apparent to the individual skilled in the art from the above description, this depends on whether the evaporator air temperature in a given case, i.e., the intake air temperature on the evaporator outlet side or the evaporator surface temperature, is being measured as the evaporator temperature which in general will be slightly below the evaporator air temperature.

The above description of the method as set forth in FIG. 1 shows that cooling operation for air conditioners is achieved by the method according to the invention for evaporator temperature control in which (during a given cooling operating phase) usually no, and at most a single, change in evaporator state takes place between dry and wet. As a result, a reliable prevention of the occurrence of evaporator odors is achieved. At the same time, by observing this condition of operation, the evaporator temperature is adjusted as much as possible to the blown air temperature setpoint. This is in order to eliminate as much reheating as possible and to keep energy consumption low. Furthermore, the method ensures that the evaporator temperature is controlled at all times to a value at which condensation effects on parts that adjoin the interior to be air conditioned and possibly additionally the exterior as well (for example condensation on vehicle windows) are reliably prevented in motor vehicle air conditioning systems.

Figure 2:
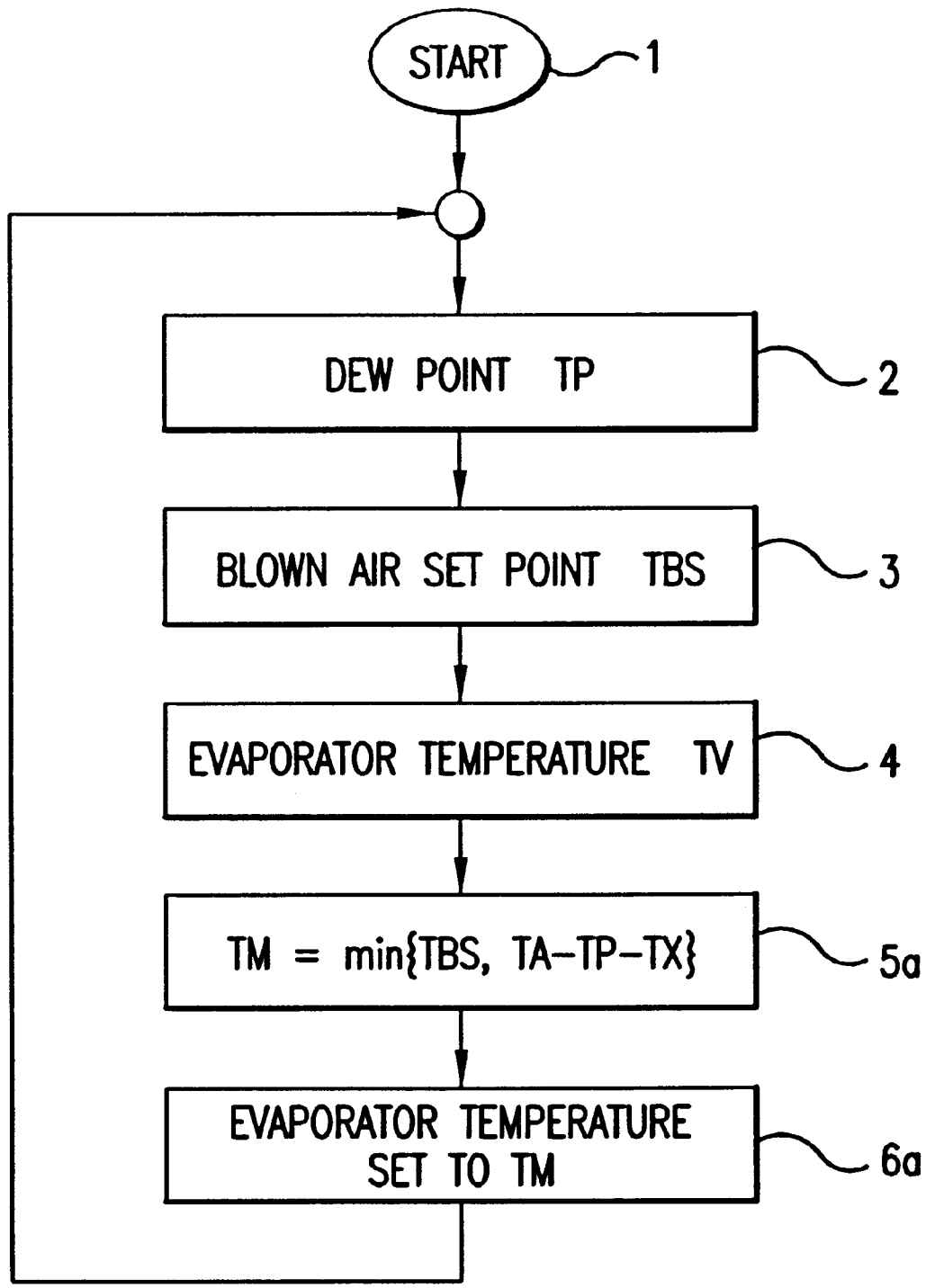
FIG. 2 is a flowchart of a second exemplary method of controlling the evaporator temperature of an air conditioner as a function of the outside dew point.

In FIG. 2, a simplified version of the method of FIG. 1 is shown as a flowchart with its most important steps. Initially, this method proceeds with steps 1 to 4 that are identical to the method in FIG. 1. Because of this, identical reference numbers have been used for these steps and can be used to refer in this connection to the description of FIG. 1.

In the interest of simplicity, it is not the evaporator state that is interrogated next, as is the case in the method in FIG. 1. Instead, the minimum value TM as between the lowest blown air temperature setpoint TBS (determined directly) on the one hand, and the difference TA-TP-TX between the actual intake air temperature TA and the intake air dew point temperature TP minus a selectable offset point TX on the other hand, is determined (step 5a). The offset point TX, depending on the application, can be equal to zero or can have any value greater than zero. The lowest blown air temperature setpoint TBS is obtained, as in the method in FIG. 1, as the smallest value of all the setpoints possibly specified differently at the various exhaust ducts of the air conditioner, Examples of this are different setpoints on the driver and passenger sides of a vehicle, and when there is an independent rear air conditioning system additional different blown air temperature setpoints for the left-hand and right-hand rear seat areas.

This is followed by a method step 6a for adjusting the evaporator temperature to the minimum temperature TM, as specified previously within preset temperature limits as described similarly above for the method shown in FIG. 1. This means that the evaporator temperature setpoint is set to the minimum value of TM determined above. This is provided the latter lies within a presettable temperature range that is limited at the upper end by the minimum evaporator temperature specified (for reasons of protection against icing) and at the upper end by an maximum value of 10° C., for example. The latter prevents operation of the evaporator at an undesirably high evaporator temperature. In addition, in many special operating situations the evaporator temperature is set independently of the minimum temperature TM found (to the lowest possible setpoint, for example) at outside temperatures below 10° C., with recirculating air operation and during defrosting operation of the air conditioner.

The method according to FIG. 2 is comparatively simple to implement, and nevertheless means that fewer changes between dry and wet evaporator states occur than with typical conventional is procedures in which the evaporator temperature is adjusted each time in special operating modes to whichever is lower. In this case, the adjustment is to the minimum blown air temperature setpoint TBS, on the one hand, or the difference TA-TP-TX between the actual temperature and the dew point temperature of the intake air minus the selectable offset point TX on the other hand.

Figure 3:
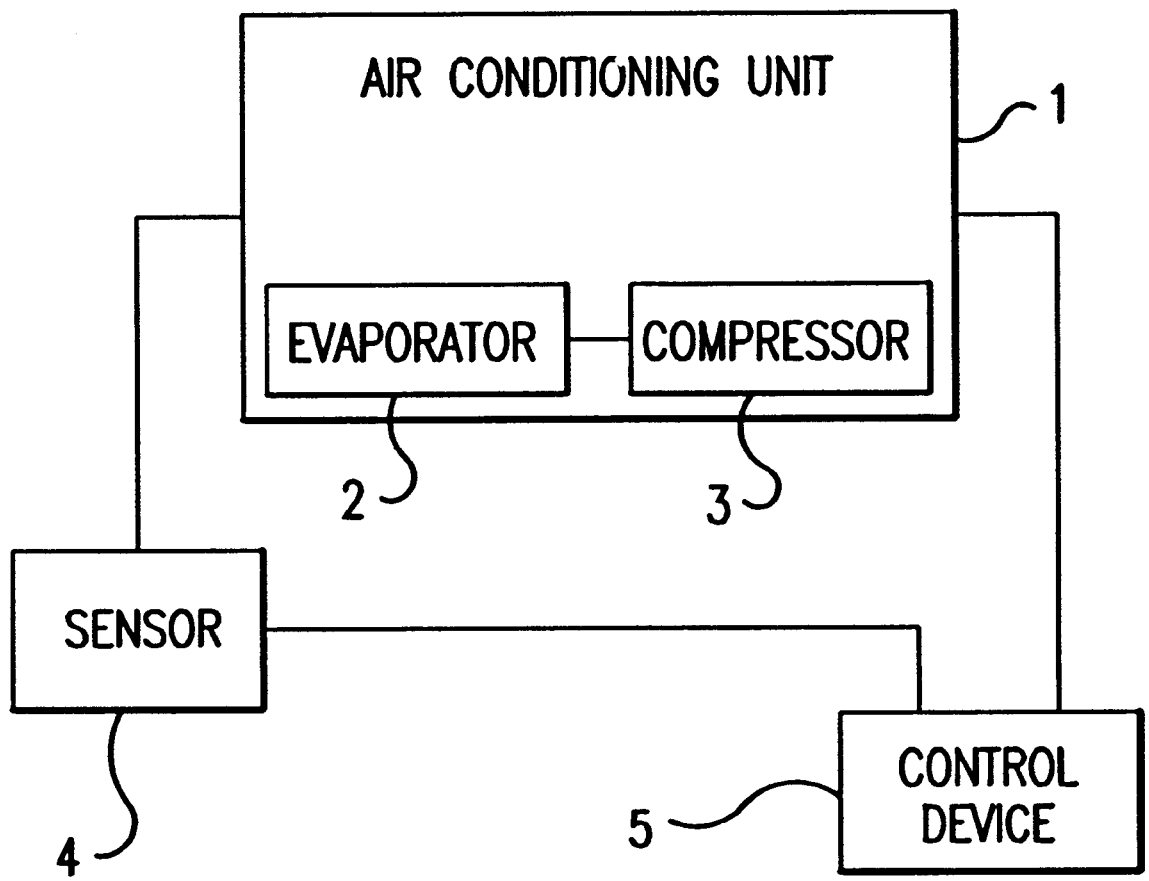
FIG. 3 is a schematic block diagram of an apparatus for implementing the method according to the invention.

FIG. 3 is a schematic diagram of the apparatus for implementing the method of the present invention. An air conditioning unit 1 is connected to a sensor 4. Shown in the air conditioning unit 1 is an evaporator 2 and a compressor 3. The compressor 3 is located in the coolant circuitry of the evaporator 2. Coupled to the air conditioner 1 is a control device 5. A sensor 4 for measuring the evaporator temperature is coupled to the control device 5 and the air conditioning unit 1. The apparatus permits the implementation of the method according to the invention for determining the dew point temperature of intake air drawn in by the air conditioner and the blown air temperature setpoints that are associated with one or more variably specifiable interior temperature setpoints for the intake air to be blown out into the interior of a vehicle's passenger compartment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A Method for controlling an evaporator temperature of an air conditioner, comprising:

determining a dew point temperature of intake air drawn in by the air conditioner to air-condition an interior space;

determining a blown air temperature setpoint associated with at least one variably presettable interior temperature setpoints for the intake air to be blown out into the interior;

determining at the beginning of a specific cooling operation phase of the air conditioner whether an evaporator is in a wet or a dry evaporator state;

adjusting an evaporator temperature to an evaporator temperature setpoint that is within presettable temperature limits;

detecting a wet evaporator state and a blown air temperature setpoint that is above the intake air dew point temperature; and selecting the evaporator temperature setpoint such that it is one of approximately no higher than the intake air dew point temperature and approximately as high as the blown air temperature setpoint.

2. The method according to claim 1, further comprising the acts of:

determining the evaporator temperature in order to determine whether the evaporator is in the wet or dry state;

detecting the dry evaporator state if the detected evaporator temperature is higher than the intake air dew point temperature; and detecting the wet evaporator state if the detected evaporator temperature is lower than the intake air dew point temperature.

3. The method according to claim 1, wherein the air conditioner is a motor vehicle air conditioner.

4. A method for controlling an evaporator temperature of an air conditioner as a function of an outside dew point, comprising the acts of:

determining a dew point temperature of intake air drawn in by the air conditioner to air-condition an interior;

determining a blown air temperature setpoint that is associated with at least one variably presettable interior temperature setpoints for the intake air to be blown out into the interior;

setting an evaporator temperature to an evaporator temperature setpoint that is within presettable temperature limits; and choosing the evaporator temperature setpoint within said presettable temperature limits as the smaller of the blown air temperature setpoint and the difference between intake air temperature and intake air dew point temperature minus a presettable offset point.

5. The method according to claim 3, wherein the air conditioner is a motor vehicle air conditioner.

6. A method for controlling operation of an air conditioner having an evaporator, said method comprising:

determining a dew point temperature of intake air drawn into the air conditioner;

determining a preselected blown air temperature setpoint for said air conditioner;

determining whether said evaporator is in a wet or dry state;

comparing said preselected blown air temperature setpoint and said dew point temperature;

when said evaporator is in said wet state and said preselected blown air temperature set point is greater than said dew point temperature, selecting an evaporator temperature setpoint which is no higher than said dew point temperature; and when either said evaporator is in said dry state or said preselected blown air temperature setpoint is not greater than said dew point temperature, selecting an evaporator temperature set point which is approximately equal to the blown air temperature setpoint.

7. The method according to claim 6 wherein said determining of whether the evaporator is in a wet or dry state comprises:

determining an evaporator temperature;

comparing said evaporator temperature to said dew point temperature;

determining existence of a wet evaporator state when said evaporator temperature is lower than said dew point temperature;

determining existence of a dry evaporator state when said evaporator temperature is greater than said dew point temperature.

8. Apparatus for controlling operation of an air conditioner having an evaporator, said apparatus comprising:

means for determining a dew point temperature of intake air drawn into said air conditioner;

means for determining a preselected blown air temperature set point for said air conditioner; and a control unit including means for determining whether said evaporator is in a wet state or a dry state; and means for selecting an evaporator temperature setpoint which is not greater than said dew point temperature when said evaporator is in a wet state and said preselected blown air temperature setpoint is greater than said dew point temperature, and for selecting an evaporator temperature setpoint which is approximately equal to said blown air temperature setpoint, when either said evaporator is in a dry state or said preselected blown air temperature setpoint is not greater than said dew point temperature.

* * * * *